United States Patent Office 2,864,763
Patented Dec. 16, 1958

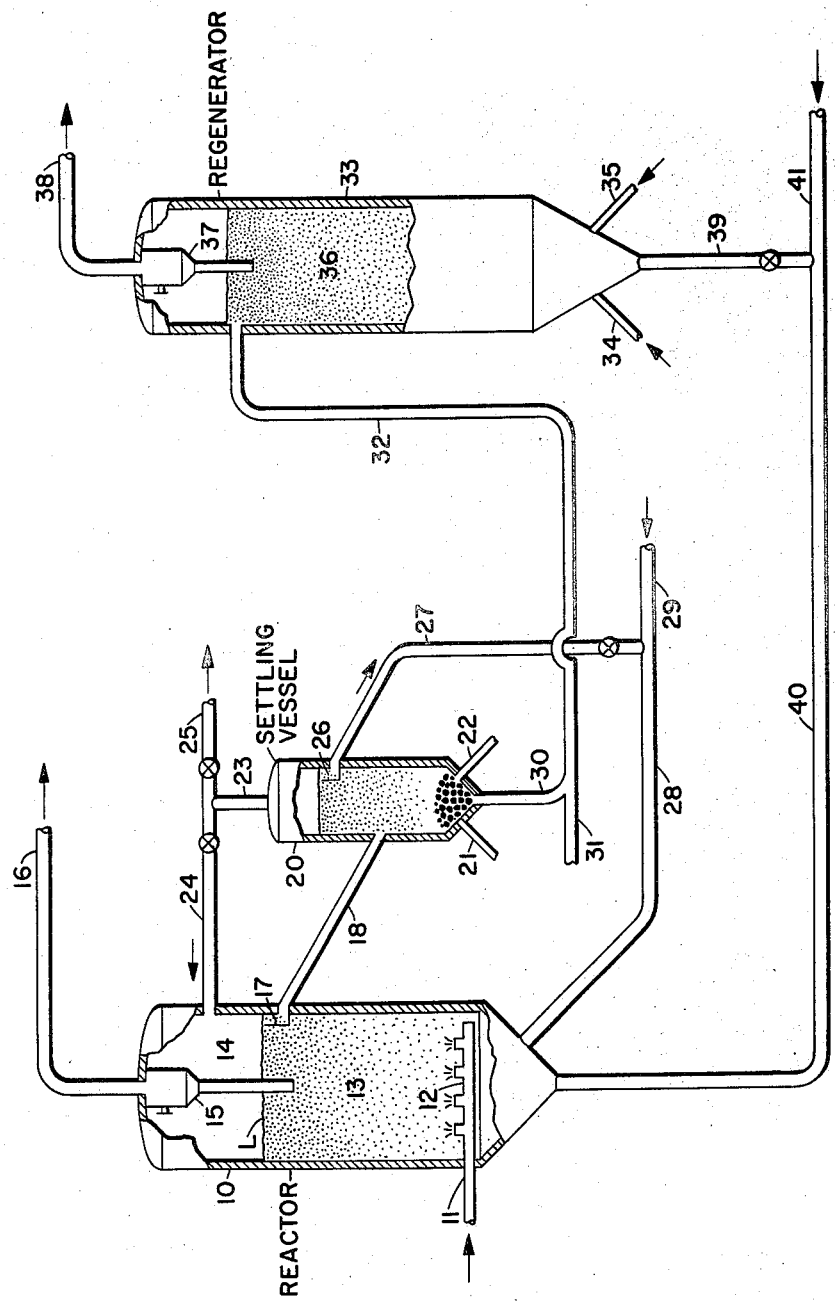

2,864,763

FLUIDIZED SOLIDS CATALYTIC REFORMING PROCESS

Bernard L. Schulman, Linden, and Walter G. May, Union, N. J., assignors to Esso Research and Engineering Company, a corporation of Delaware Application August 2, 1954, Serial No. 447,138

8 Claims. (Cl. 208—136)

This invention relates to the catalytic conversion of hydrocarbons, and more particularly to the catalytic reforming or hydroforming of hydrocarbon fractions boiling in the motor fuel or naphtha range of low knock rating into high octane number motor fuels rich in aromatics by the fluidized solids technique.

It is known that petroleum naphthas can be subjected to a reforming treatment to yield liquid products boiling within the gasoline boiling range and possessing higher octane numbers and better engine cleanliness characteristics. A well known and widely used process for upgrading petroleum naphthas is called hydroforming. In hydroforming, the naphtha feed stock is treated at elevated pressures of from about 50 to 1000 pounds per square inch and at temperatures of 750°–1050° F. in the presence of a solid catalyst and hydrogen or recycle gas rich in hydrogen. A variety of reactions, including dehydrogenation, paraffin and naphthene isomerization, cyclization or aromatization, hydrogenation, and hydrocracking, occur during hydroforming.

Catalysts that have been used in hydroforming include metals such as platinum or palladium and oxides or sulfides of group VI metals, particularly molybdenum, chromium, vanadium, and tungsten. These catalysts are usually supported on a base or spacing agent, preferably on an adsorptive or high surface area alumina-containing composition such as various activated aluminas, alumina gel, zinc aluminate spinel, and the like.

It has been proposed to effect the hydroforming of naphtha fractions in a fluidized solids reactor system in which the naphtha vapors are passed continuously through a dense, fluidized bed of finely divided hydroforming catalyst particles in a reaction zone, spent catalyst being withdrawn continuously from the dense bed in the reaction zone and passed to a separate regeneration zone where inactivating carbonaceous deposits are removed by combustion, whereupon the regenerated catalyst particles are returned to the main reactor vessel or hydroforming reaction zone. Fluid hydroforming as thus conducted has several fundamental advantages over fixed bed hydroforming, such as (1) the operations are continuous, (2) the vessels can be designed for single rather than dual functions, (3) the reactor temperature is substantially constant throughout the reactor dense bed, and (4) the regeneration or reconditioning of the catalyst may be readily controlled to maintain catalyst activity and selectivity at a relatively constant level rather than to permit it to fluctuate over a relatively wide range.

Difficulty has been encountered in achieving a heat balanced operation in fluid hydroforming. Because of selectivity considerations, low catalyst to oil ratios must be supplied to the hydroforming reaction zone, and such low catalyst to oil ratios limit the amount of heat that can be safely transferred from the regeneration zone to the reaction zone as sensible heat in the catalyst. Since the amount of heat released in the regenerator is so great that the catalyst is incapable of transferring it to the reaction zone at the temperatures and the low catalyst to oil ratios used, it is common practice to arrange cooling coils in the regenerator to remove heat over and above that which can be safely transferred to the reactor by the catalyst. It is, therefore, necessary to supplement the heat supplied to the reaction zone by the catalyst, and this is done by preheating the feed stock and the recycle or hydrogen-rich process gas to temperatures well above the average reactor temperature. This preheating has an adverse effect upon the yield of liquid products, since it brings about thermal degradation of the feed as well as the higher molecular weight constituents of the recycle gas. Moreover, excessively large amounts of recycle gas must be introduced to carry heat into the reaction zone. The cost of installing and operating this extra compressor and heat exchange capacity adds very substantially to the total plant costs.

It has been proposed to overcome this heat transfer problem by circulating inert, heat-transfer solids or shot between the reactor and regenerator for absorbing heat in the regenerator and carrying that heat into the reaction zone. It would be a relatively simple matter, of course, to add inert solids to the catalyst and circulate a homogeneous mixture between the reactor and the regenerator. However, this would not be practicable because the use of about 3 to 5 parts of heat transfer solids per part of catalyst would require a reduction in hydrocarbon feed rate to the reactor to one-fourth or less because valuable reactor space is occupied by inert heat transfer solids rather than by catalyst.

It is the object of this invention to provide the art with an improved method and apparatus for the conversion of hydrocarbons by the fluidized solids technique.

It is also the object of this invention to provide the art with a fluidized solids reactor system in which inert heat transfer solids may be circulated between a reaction zone and a regeneration or heater zone in a novel and advantageous manner.

It is a further object of this invention to provide a fluidized solids reactor system in which inert heat transfer solids may be circulated between a reaction zone and a regeneration or heater zone at a rate which may be readily controlled to provide the desired heat input to the reaction zone and/or the desired heat removal from the regeneration zone.

It is also an object of this invention to provide a fluidized solids reactor system in which catalyst and inert heat transfer solids pass concurrently upflow through a reaction zone in order to maximize the length of travel of said solids and improve or increase the amount of contact of gaseous reactants with the catalytic as well as the non-catalytic solids.

These and other objects will appear more clearly from the detailed specification and claims which follow.

In accordance with the present invention inert heat transfer solids or shot and cataylst are introduced into the bottom of the reactor vessel and withdrawn from the top of the bed. Since the inert heat transfer solids or shot are ordinarily larger and of greater density than the cataylst particles, the flow in this arrangement is opposite to that which the shot would normally follow. Even through larger and of greater density than the catalyst particles, the inert heat transfer solids or shot will rise from the bottom to the top of the bed naturally, due to the bulk mixing action of the fluid bed. However, the shot also tends to settle back into the bed at the same time because of its settling velocity relative to that of the finer catalyst particles. This, therefore, would tend to establish a concentration gradient with high shot concentration at the bottom and low at the top. This is opposite to the arrangement or condition that would be most desirable for circulation of the shot in accordance with the present invention. This could be taken care of by making the concentration of shot at the bottom of the reactor dense bed excessively large and thus in turn increasing the shot concentration at the top of the bed to a sufficiently high level to provide the necessary flow of shot from the reactor vessel. This, however, would necessitate providing a large preponderance of shot or inert heat transfer solids in the reaction zone and would effect a marked decrease in the capacity of the reactor. Another alternative would be to make the inert heat transfer solids of sufficiently lower density that they could be made to rise to the surface and float upon the fluidized bed of catalyst particles. This is not practical, however, since the most readily available inert heat transfer solids are ordinarily of greater density than the usual fluidizable catalyst particles.

In accordance with this invention, the use of excessive amounts of inert heat transfer solids is avoided and this concentration gradient is reduced by maintaining a very substantial upward flow of fines along with the shot so that the shot is carried upward by virtue of the net upward flow of the bed. The catalyst-shot mixture is taken off of the side of the bed and transferred to a suitable settling vessel or chamber. The shot is allowed to settle out with a suitable amount of catalyst or with substantially no catalyst (by adjustment of operating conditions) and is transferred to the other vessel of the two-vessel system. The catalyst, or the major portion of the catalyst, is withdrawn at the top of the settling vessel into a standpipe and is returned to the reactor vessel at or near the bottom thereof. This recirculation of the catalyst determines the net upward flow of the bed and also the concentration of the shot in the bed. The higher the rate of recirculation of the catalyst, the lower the shot concentration in the bed. Using this method, the shot inventory in the system can be used to determine the ratio of shot to catalyst in the circulating stream.

By operating in the foregoing manner, all the gas contacts all the solid; that is, the gas carrying the shot and catalyst from the regenerator is admitted at the bottom, instead of a substantial distance up the reactor. This is a very important advantage, and would be more important in some other cases, e. g., shale retorting, where the solids are circulated through the regenerator. Moreover, in hydroforming, the naptha feed can be injected into the recycle gas-recycle catalyst mixture, thereby obviating the necessity for a special injection spider.

Some control of shot:catalyst ratio circulating can be obtained by varying the amount of catalyst being recycled. By increasing this recycle, the shot:cataylst ratio circulating between reactor and regenerator will be increased. For large variations in shot:catalyst, however, shot inventory must be altered.

Reference is made to the accompanying drawing illustrating digrammatically a two-vessel reactor system in accordance with the present invention.

The particular embodiment illustrated is pointed particularly to the hydroforming of naptha or motor fuel fractions. It will be understood, however, that this invention can also be utilized in other processes such as catalytic cracking, coking, of residual petroleum fractions, and shale retorting, each of which may require some small or minor modifications for most effective utilization of this invention.

In the drawing, 10 is a reactor vessel to which preheated charging stock is supplied through inlet line 11 and distributor ring or nozzles 12. The reactor vessel is charged with finely divided catalyst particles and inert heat transfer solids or shot which are maintained as a dense, fluidized, liquid simulating mass or bed 13 having a definite level L or interface separating the dense, fluidized bed 13 from a disperse or dilute phase 14 comprising small amounts of catalyst entrained in the vaporous reaction products which occupies the upper part of the reaction zone. The reaction products pass overhead from reactor vessel 10 through a cyclone separator 15 or the like in order to free them of most of the solid particles that are entrained therewith. The separated solid particles are returned to the reactor dense bed through the dip leg attached to the bottom of the cyclone separator 15. Reaction products substantially free of catalyst or other solid particles are removed through product outlet line 16 to suitable product recovery, stabilizing, and/or storage equipment.

Suitable catalysts for charging to the reactor vessel 10 are metal oxides such as molybdenum oxide, chromium oxide, tungsten oxide, vanadium oxide, or the like, or mixtures thereof, alone or preferably upon a support or carrier such as activated alumina, zinc aluminate spinel, or the like. Other hydroforming catalysts such as platinum or palladium upon alumnia can also be used. Cracking catalysts that may be used include silica-alumnia cogels, silica-magnesia, and acid activated clays. The catalyst particles should, for proper fluidization, be between about 200 to 400 mesh in size or about 10 to 200 microns in diameter with a major proportion between about 20 and 100 microns.

The inert, heat transfer solids or shot are preferably coarser and/or of greater density than the catalyst used in the process. Suitable materials for use as inert, heat transfer solids are corundum, mullite, fused alumina, fused silicia, or the like. It is nevessary that the heat transfer solids have no adverse effect upon the hydroforming process or other catalytic reaction and that they be stable or resistant to breakdown due to the thermal and physical forces to which they are subjected in the process. The size of the heat transfer solids may vary from about 100 to 800 and they are preferably 300 to 500 microns in diameter and also are preferably in the shape of spherical or spheroidal particles. The inert heat transfer solid particles are of as small a diameter as may be used and still obtain adequate separation in the settling vessel.

The catalyst and the inert heat transfer particles are introduced into the bottom of the reactor vessel 10, as will be described in detail below. The catalyst and inert heat transfer solids are maintained as a dense, fluidized, liquid simulating bed 13 by the passage therethrough of the vaporous reactants and diluent gases or vapors. The catalyst and inert heat transfer solids are taken off of the side of the reactor bed as by overflowing into withdrawal well 17, from which the mixture flows through transfer line 18 into settling vessel 20. Gas such as steam is introduced through lines 21 and 22 at the bottom of settling vessel 20 in order to effect a settling or separation of shot or inert heat transfer solids from catalyst. Gas is taken overhead from settling vessel 20 and is passed via line 23 and line 24 into the dilute phase in reactor vessel 10 or via line 23 and line 25 to a stack or separate recovery means. Catalyst and at most a minor proportion of heat transfer solids or shot flows into withdrawal well 26 in the settling vessel 20 and thence into standpipe 27 wherein fluistatic pressure is built up sufficient to facilitate return of catalyst to the reactor vessel. Catalyst is discharged from the base of standpipe 27 through a slide valve or the like into a transfer line 28, where it is picked up by a stream of recycle gas, naphtha feed vapors or the like supplied through line 29 and carried back into the base of the reactor vessel. If desired, the recycle catalyst and shot may be discharged from standpipe 27 into transfer line 40, as will be described below.

Shot or a mixture of a major proportion of shot and a minor proportion of catalyst is withdrawn from the bottom of settling vessel 20 via line 30 and is conveyed by air or other carrier gas supplied through line 31 through transfer line 32 into regenerator vessel 33. While line 32 is shown discharging into the upper part of the regenerator, it could also discharge into the bottom, in which case maximum utilization of the carrier gas or air in the regenerator would be achieved. Air or regeneration gas is supplied to the bottom of regenerator vessel 33 through lines 34 and 35 at a sufficient rate to maintain the shot or shot-catalyst mixture as a dense, fluidized bed 36. In the event that there is insufficient carbonaceous material upon the shot or mixture of shot and catalyst supplied to regenerator 33 to raise the temperature of the solids to the desired level, an extraneous liquid or gaseous fuel may be supplied to regenerator 33 or to the solid particles in transfer line 32 in order to heat the solid particles to the desired temperature.

Combustion gases are taken overhead from regenerator 33 through a cyclone separator 37 for removing solid particles therefrom and discharged through outlet line 38 to a waste gas stack or to suitable scrubbing and storage equipment in the event that it is desired to use this gas as a carrier, diluent, or stripping gas.

Heated shot or shot-catalyst mixture is discharged from the base of regenerator 33 into standpipe 39, wherein sufficient fluistatic pressure is built up to facilitate transfer of these solids back into reactor vessel 10. The shot or shot-catalyst mixture is discharged through a slide valve or other flow control means arranged at the bottom of standpipe 39 into transfer line 40, where it is picked up by a stream of hydrogen-rich recycle gas or other suitable carrier gas and carried back into the bottom of the reactor vessel 10. As indicated above, recycle reactor catalyst withdrawn from settling vessel 20 can be discharged into transfer line 40 for intermixture with the hot shot and freshly regenerated catalyst and transfer therewith in a stream of recycle gas back into the reactor. It is desirable in this event to add the recycle reactor catalyst at or as close as possible to the point at which the hot freshly regenerated catalyst is discharged into the recycle gas stream in order to lower and control temperature and avoid cracking of recycle gas as well as over-pretreatment of the freshly regenerated catalyst. It is desirable in this arrangement to supply the naphtha feed either through a spider or other suitable distributor means within the reactor or to the transfer line 40 as close to the reactor as is possible and still obtain good mixing.

It will be understood that numerous variations in the above-described and illustrated arrangements are possible. For example, the withdrawal well and line for transferring the shot-catalyst mixture to the settling vessel can be arranged in the lower part of the dense bed, say at between about ⅓ to ½ of the depth of the dense bed 13, particularly when the dense bed is more than about 20-25 ft. deep. Similarly the catalyst-shot mixture can be supplied to the regenerator at the bottom and withdrawn from any desired part of the dense bed 36. Also, instead of introducing the naphtha feed separately to the reactor, it can be intermixed with recycle gas and supplied to line 29 in order to convey the recycle catalyst and shot from the base of the settling vessel into the reactor.

*Example*

A typical hydroforming operation in accordance with the present invention is as follows. A reactor vessel about 80 feet high and about 14 feet inside diameter is charged with shot, for example, mullite of about 300 microns diameter and 10% molybdic oxide on alumina catalyst about 20-100 microns in diameter, sufficiently to provide a dense bed 13 about 50 feet deep. In view of this depth of bed, the withdrawal well is arranged about 15-20 feet above the bottom of the bed. The reactor vessel is charged with 11,500 barrels of naphtha per day and the reactor is operated at 200 p. s. i. g. and at 950° F. The naphtha is preferably mixed with the catalyst and shot which is recycled from the settling vessel back into the reactor vessel. The recycle gas rate is 500° cubic feet per barrel of naphtha feed and the catalyst to oil weight ratio supplied to the reactor is 0.725 and the shot to catalyst ratio is 3 to 1. The superficial gas velocity through the reactor is 1.0 foot per second and the recycle gas returning catalyst from the stripper-settler=2,000 S. C. F. M. The recycle gas returning shot and catalyst from regenerator=20,500 S. C. F. M.

The conditions in the settling vessel, which also serves as a stripper, and in the regenerator, are as follows:

Settler-stripper:
    Shot fed into the side=88 lbs./sec.
    Catalyst fed into the side=138 lbs./sec.
    Shot withdrawn at bottom=77 lbs./sec.
    Catalyst withdrawn at bottom=26 lbs./sec.
    Shot recycled back to reactor=11 lbs./sec.
    Catalyst recycled back to reactor=112 lbs./sec.
    Steam=5,260 S. C. F. M.
    Gas velocity=0.2 ft./sec.
    Stripping steam=4.0 lbs./100 lbs. of shot and catalyst withdrawn at the bottom and supplied to the regenerator.

Regenerator:
    Carbon on feed=1.0%
    Air required=3,200 S. C. F. M.
    Gas velocity=0.55 ft./sec.
    $T$=1100° F.
    $P$=195 p. s. i. g.

The feed or charging stock to the reactor in a hydroforming operation may be a virgin naphtha, a cracked naphtha, a Fischer-Tropsch naphtha, or the like, having a boiling range of from about 125-450° F., or it may be a narrow boiling cut from within this range. The feed stock is preheated alone or in admixture with recycle gas to reaction temperature or to the maximum temperature possible while avoiding thermal degradation of the feed stock. Ordinarily, preheating of the feed stock is carried out at about 800°-1000° F., preferably about 950° F. Hydrogen-rich gas or recycle process gas which contains 50 volume percent or more of hydrogen is preheated to temperatures of about 1000°-1200° F. in suitable preheat coils. Recycle gas is circulated through the reaction zone at a rate of from about 500 to 8000 cubic feet per barrel of naphtha feed.

The hydroforming reactor vessel is operated at about 900°-950° F., and at pressures of about 50-1000 pounds per square inch, preferably about 200 pounds per square inch. In the case of molybdenum oxide on alumina catalysts, it is desirable to maintain a small water partial pressure (approximately 0.1 to about 3.0 mol percent) in the reaction zone. This water partial pressure can be obtained from water in the feed and/or in the recycle gas and also due to the formation of water in the regeneration as well as the pretreatment or partial reduction of the regenerated catalyst. This small water partial pressure permits operation at somewhat higher temperatures without loss in selectivity than is possible in the same system but lacking this water partial pressure.

The regenerator is operated at essentially the same pressure as the hydroforming reactor vessel and at temperatures of about 1000°-1200° F. or low enough to avoid any danger of thermally degrading the catalyst. The average residence time of the catalyst in the reactor is of the order of from about 1 to 4 hours and in the regenerator of from about 3 to 15 minutes. The average residence time of the heat transfer solids or shot in the reaction zone is of the order of from about 3 minutes to 20 minutes and in the regenerator it may be about 3 to 15 minutes, i. e., coextensive with the residence of the catalyst in the regenerator, or it may have a shorter residence time as when gas velocities through the regenerator are low enough and the regenerator itself is designed for segregation of shot.

The weight ratio of catalyst to oil introduced into the reactor should ordinarily be about 0.5 to 3.5, although catalyst to oil ratios of 0.1 and less may be used with platinum catalysts. It is ordinarily preferable to operate at catalyst to oil ratios of about 1.0, since higher ratios tend to give higher or excessive carbon or coke formation. Somewhat higher ratios can be used at higher pressures.

Space velocities or the weight in pounds of feed charged per hour per pound of catalyst in the reactor depends upon the age or activity level of the catalyst, the character of the feed stock, and the desired octane number of the product. Space velocity for a molybdic oxide on alumina gel catalyst may vary, for example, from about 1.5 w./hr./w. to about 0.15 w./hr./w.

The foregoing description contains a limited number of embodiments of the present invention. It will be understood, however, that this invention is not limited thereto, since numerous variations are possible without departing from the scope of this invention.

What is claimed is:

1. A method of carrying out endothermic reactions which comprises contacting vaporous reactants with a mixture of a major proportion of finely divided solid catalyst particles and a minor proportion of inert heat transfer solid particles of greater density and larger average particle size than said catalyst particles in a main reaction zone, continuously introducing catalyst and heat transfer solid particles and vaporous reactants to the bottom of the main reaction zone, controlling the vapor velocities through said main reaction zone to form a dense, fluidized bed of solid particles and vaporous reactants in said reaction zone, continuously removing vaporous reaction products substantially free of solid particles overhead from said main reaction zone, continuously removing a mixture of catalyst particles and inert heat transfer solids from the upper portion of the dense fluidized bed in said main reaction zone, transferring the withdrawn mixture of solids to a settling vessel passing an aeration gas into the bottom of said settling vessel at a relatively low velocity permitting the settling of the heat transfer solids to the bottom of said settling vessel, withdrawing aeration gas substantially free of solid particles overhead from said settling vessel, withdrawing a first stream of said particles comprising a major proportion of catalyst and a minor proportion of heat transfer solids as a side stream from the upper part of said settling vessel and a second stream of solid particles comprising a major proportion of heat transfer solids and a minor proportion of catalyst from the bottom of said settling vessel, recycling said first stream of solid particles to the bottom of the main reaction zone in a stream of recycle gas, conveying said second stream solid particles to a regeneration and heating zone, passing air through the latter zone to maintain a fluidized bed of solids therein and burn combustible materials therein, thereby regenerating the catalyst and heating the catalyst and heat transfer solids, withdrawing hot heat transfer solids and catalyst particles from the bottom of said regeneration and heating zone, and recycling them to the lower part of the main reaction zone.

2. The method as defined in claim 1 wherein the upward flow of solids in the main reaction zone is controlled by varying the recycling of catalyst-heat transfer solids mixture from the settling vessel to the main reaction zone.

3. The method of hydroforming hydrocarbon fractions boiling within the motor fuel or naphtha range which comprises contacting a mixture of vaporized hydrocarbons and hydrogen-containing gas with a mixture of finely divided hydroforming catalyst particles and inert heat transfer solid particles of greater density and larger average particle size than the said catalyst particles, maintaining the reaction zone at pressures of from about 50 to about 1000 pounds per square inch and at temperatures of from 900° F. to 950° F., continuously introducing catalyst and heat transfer solid particles and vaporous reactants to the bottom of the main reaction zone, controlling the vapor velocities through said main reaction zone to form a dense, fluidized bed of solid particles and vaporous reactants in said reaction zone, continuously removing vaporous reaction products substantially free of solid particles overhead from said main reaction zone, continuously removing a mixture of catalyst particles and inert heat transfer solids from the upper portion of the dense, fluidized bed in said main reaction zone, transferring the withdrawn mixture of solids to a settling vessel passing an aeration gas into the bottom of said settling vessel at a relatively low velocity permitting the settling of the heat transfer solids to the bottom of said settling vessel, withdrawing aeration gas substantially free of solid particles overhead from said settling vessel, withdrawing a first stream of said particles comprising a major proportion of catalyst and a minor proportion of heat transfer solids as a side stream from the upper part of said settling vessel and a second stream of solid particles comprising a major proportion of heat transfer solids and a minor proportion of catalyst from the bottom of said settling vessel, recycling said first stream of solid particles to the bottom of the main reaction zone in a stream of recycle gas, conveying said second stream solid particles to a regeneration and heating zone, passing air through the latter zone to maintain a fluidized bed of solids therein and burn combustible materials therein, thereby regenerating the catalyst and heating the catalyst and heat transfer solids, withdrawing hot heat transfer solids and catalyst particles from the bottom of said regeneration and heating zone and recycling them to the lower part of the main reaction zone.

4. The method as defined in claim 3 wherein the upward flow of solids in the main reaction zone is controlled by varying the recycling of catalyst-heat transfer solids mixture from the settling vessel to the main reaction zone.

5. The process as defined in claim 3 wherein the hydroforming catalyst comprises a group VI metal oxide upon an alumina-containing support.

6. The process as defined in claim 3 wherein the hydroforming catalyst comprises a platinum group metal upon an alumina-containing support.

7. The process as defined in claim 3 in which the mixture of a major proportion of catalyst and a minor proportion of heat transfer solids is recycled from the separating vessel to the main reaction vessel in admixture with fresh naphtha feed and hydrogen-rich recycle gas.

8. The process as defined in claim 3 in which the hot heat transfer solids and catalyst are recycled from the regeneration and heating zone to the main reaction zone in admixture with hydrogen-rich recycle gas.

References Cited in the file of this patent

UNITED STATES PATENTS

| 2,393,909 | Johnson | Jan. 29, 1946 |
| 2,446,247 | Scheineman | Aug. 3, 1948 |
| 2,721,167 | Nicholson | Oct. 18, 1955 |